(12) United States Patent
Yukawa

(10) Patent No.: US 12,720,557 B2
(45) Date of Patent: Aug. 25, 2026

(54) COMMUNICATION DEVICE, COMMUNICATION METHOD, AND STORAGE MEDIUM

(71) Applicant: CANON KABUSHIKI KAISHA, Tokyo (JP)

(72) Inventor: Mitsuyoshi Yukawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 541 days.

(21) Appl. No.: 18/056,207

(22) Filed: Nov. 16, 2022

(65) Prior Publication Data

US 2023/0076833 A1 Mar. 9, 2023

Related U.S. Application Data

(63) Continuation of application No. PCT/JP2021/016584, filed on Apr. 26, 2021.

(30) Foreign Application Priority Data

May 22, 2020 (JP) ................................ 2020-089815

(51) Int. Cl.
*H04W 72/23* (2023.01)
*H04W 72/0446* (2023.01)
*H04L 5/00* (2006.01)

(52) U.S. Cl.
CPC ....... *H04W 72/23* (2023.01); *H04W 72/0446* (2013.01); *H04L 5/0007* (2013.01)

(58) Field of Classification Search
CPC ....................... H04L 5/0094; H04W 72/0446; H04W 76/15; H04W 72/23; H04W 72/0453; H04W 92/20; H04W 84/12
See application file for complete search history.

(56) References Cited

U.S. PATENT DOCUMENTS

2017/0289994 A1 10/2017 Kim
2018/0205441 A1* 7/2018 Asterjadhi .......... H04W 72/044
(Continued)

FOREIGN PATENT DOCUMENTS

CN 110536469 A 12/2019
GB 201919090 2/2020
(Continued)

OTHER PUBLICATIONS

Jason Yuchen Guo (Huawei Technologies), A unified transmission procedure for multi-AP coordination, IEEE 802.11-19/1102r0, IEEE, Aug. 2019, URL:https://mentor.ieee.org/802.11/dcn/19/11-19-1102-00-00be-a-unified-transmission-procedure-for-multi-ap-coordination.pptx.

(Continued)

*Primary Examiner* — Jason E Mattis
*Assistant Examiner* — Bao G Nguyen
(74) *Attorney, Agent, or Firm* — Canon U.S.A., Inc. IP Division

(57) ABSTRACT

A communication device (100) that operates as an access point transmits a frame including first information to request communication devices (104, 105, 106) configured to operate as an access point to transmit information about the own device to the communication device (100) and second information indicating an RU used by the communication devices (104, 105, 106) to transmit the first information, and receives, in parallel, a response frame in response to the transmitted frame including information about the communication devices (104, 105, 106) in the RU indicated by the second information using Orthogonal Frequency Division Multiple Access (OFDMA).

11 Claims, 9 Drawing Sheets

(56) References Cited

U.S. PATENT DOCUMENTS

| | | | | |
|---|---|---|---|---|
| 2018/0324685 | A1* | 11/2018 | Patil | H04W 76/11 |
| 2020/0037395 | A1 | 1/2020 | Ko | |
| 2020/0146052 | A1* | 5/2020 | Iwai | H04W 74/085 |
| 2020/0336989 | A1* | 10/2020 | Rong | H04W 52/246 |
| 2021/0022156 | A1* | 1/2021 | Bhanage | H04W 72/535 |
| 2022/0015141 | A1* | 1/2022 | Huang | H04W 72/0453 |

FOREIGN PATENT DOCUMENTS

| | | | |
|---|---|---|---|
| JP | 2012095340 | A | 5/2012 |
| JP | 2018050133 | A | 3/2018 |
| JP | 2020048237 | A | 3/2020 |
| SG | 10202003138 | U * | 11/2021 |
| WO | 2018231719 | A1 | 12/2018 |
| WO | 202001905 | A1 | 1/2020 |
| WO | 2020045891 | A1 | 3/2020 |

OTHER PUBLICATIONS

Ross Jian Yu (Huawei), MRU signaling in trigger frame, IEEE 802.11-20/0416r0, IEEE, Mar. 2020, URL:https://mentor.ieee.org/802.11/dcn/20/11-20-0416-00-00be-mru-signaling-in-trigger-frame.pptx.

Sungjin Park (LG Electronics), Data Sharing for Multi-AP Coordination, IEEE 802.11-19/1554r1, IEEE, Sep. 2019; URL:https://mentor.ieee.org/802.11/dcn/19/11-19-1554-01-00be-data-sharing-for-multi-ap-coordination.pptx.

* cited by examiner 103
106
104
101
100
108
107
105
102

FIG.3

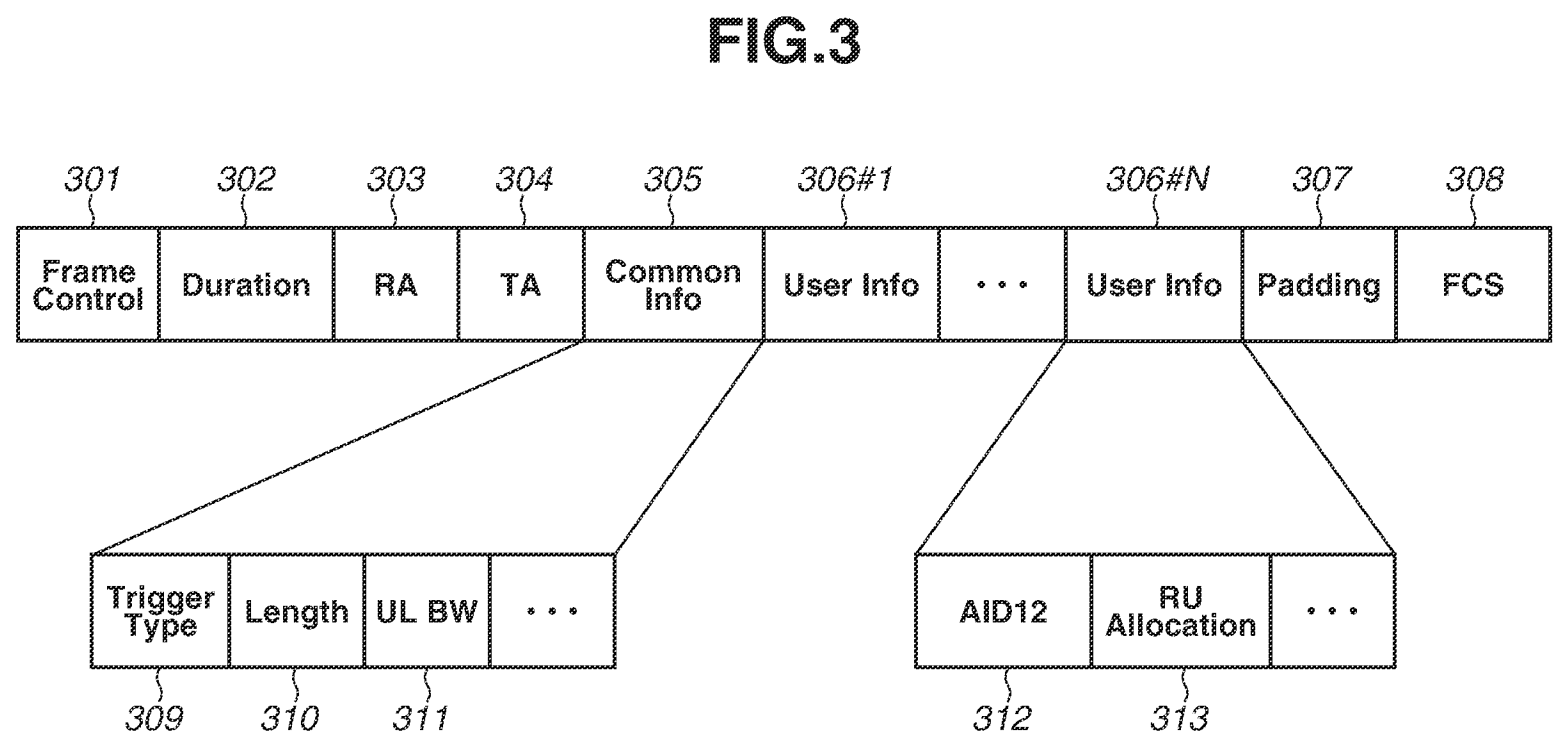

301 Frame Control
302 Duration
303 RA
304 TA
305 Common Info
306#1 User Info
...
306#N User Info
307 Padding
308 FCS 309 Trigger Type
310 Length
311 UL BW
...

312 AID12
313 RU Allocation
...

FIG.4

Multi-AP Group formation Response frame Action Field

| Frame Control | Duration | RA | TA | BSSID | category | action | BSSID2 | Buffer status | Multi-AP participation | Number of STA | AID List | Trigger frame signal intensity | FCS |
|---|---|---|---|---|---|---|---|---|---|---|---|---|---|
| | | | | | | | 409 | 410 | 411 | 412 | 413 | 414 | |

MAC header

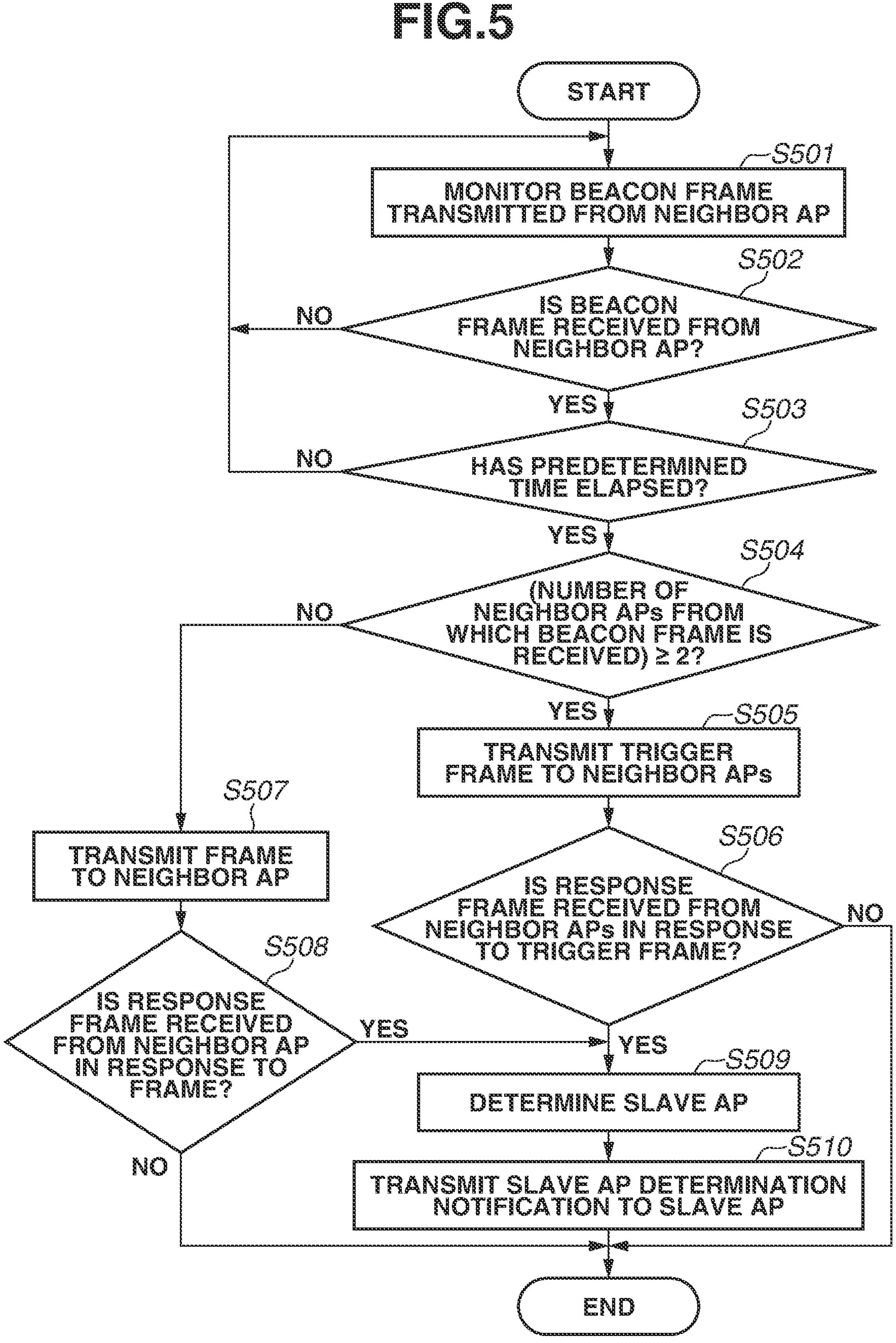
FIG.5
START
S501
MONITOR BEACON FRAME TRANSMITTED FROM NEIGHBOR AP
S502
IS BEACON FRAME RECEIVED FROM NEIGHBOR AP?
NO
YES
S503
HAS PREDETERMINED TIME ELAPSED?
NO
YES
S504
(NUMBER OF NEIGHBOR APs FROM WHICH BEACON FRAME IS RECEIVED) ≥ 2?
NO
YES
S505
TRANSMIT TRIGGER FRAME TO NEIGHBOR APs
S507
TRANSMIT FRAME TO NEIGHBOR AP
S506
IS RESPONSE FRAME RECEIVED FROM NEIGHBOR APs IN RESPONSE TO TRIGGER FRAME?
NO
S508
IS RESPONSE FRAME RECEIVED FROM NEIGHBOR AP IN RESPONSE TO FRAME?
YES
YES
S509
DETERMINE SLAVE AP
NO
S510
TRANSMIT SLAVE AP DETERMINATION NOTIFICATION TO SLAVE AP
END AP100
AP104
AP105
AP106
Beacon Frame
M8011
Trigger Frame
Trigger type
Sub-Field Value = 0
AID = 2047
M8012
Trigger Frame
Response Frame
M8013
DETERMINE
SLAVE AP
Slave AP
Determination
Notification Frame Null Subcarriers
901
902
903
904
26
26
26
26
13
13
26
26
26
26
52
52
13
13
52
52
106
13
13
106
242

COMMUNICATION DEVICE, COMMUNICATION METHOD, AND STORAGE MEDIUM

CROSS-REFERENCE TO RELATED APPLICATIONS

This application is a Continuation of International Patent Application No. PCT/JP2021/016584, filed Apr. 26, 2021, which claims the benefit of Japanese Patent Application No. 2020-089815, filed May 22, 2020, both of which are hereby incorporated by reference herein in their entirety.

BACKGROUND OF THE INVENTION

Field of the Invention

The present invention relates to a communication device that performs wireless communication, and a wireless communication method.

Background Art

With the recent increase in the amount of data to be communicated, communication techniques such as a wireless local area network (LAN) have been developed. The Institute of Electrical and Electronics Engineers (IEEE) 802.11 standard series are known as main communication standards for the wireless LAN. The IEEE 802.11 standard series include IEEE 802.11 a/b/g/n/ac/ax standards.

In the IEEE 802.11ax described in Patent Literature 1, a technique for providing a high peak throughput of up to 9.6 gigabits per second (Gbps) by Orthogonal Frequency-Division Multiple Access (OFDMA) and improving a communication speed in a congestion situation is standardized. Note that OFDMA stands for Orthogonal Frequency-Division Multiple Access.

As successor standards aiming to achieve a further enhancement in throughput, an improvement in frequency utilization efficiency, and an improvement in communication latency, a task group for developing the IEEE 802.11be standard (hereinafter referred to as 11be) has been formed.

In the 11be, a technique for causing a plurality of access points (APs) to operate in cooperation and communicate data with a station (STA), thereby achieving an enhancement in communication performance, such as an improvement in communication rate and a reduction in radio wave interference using beamforming, has been studied.

An example of the cooperative operation of a plurality of APs is a distributed-Multi-Input Multi-Output (MIMO) technique based on the MIMO technique in which a plurality of transmission and reception antennas is used at the same time and in the same channel. In the distributed-MIMO, under an environment where a plurality of APs and a plurality of STAs coexist, information about a communication state and each AP state is shared among the plurality of APs and data is transmitted from each AP to the STA at the same timing. Such a cooperative operation of the plurality of APs enables an increase in the number of spatial streams compared to a case where a single AP performs communication. Accordingly, it is expected that throughput can be enhanced.

The above-described communication technique in which the plurality of APs operates in cooperation is referred to as Multi-AP communication. The APs are classified into a master AP that manages the other APs and a slave AP that operates under the management of the master AP.

It may be desirable to determine the slave AP to participate in Multi-AP communication from among the APs present in the vicinity of the master AP before the APs communicate data with the STA in the Multi-AP communication. To determine the slave AP, it may be desirable to receive information, such as a congestion status and information indicating whether to participate in the Multi-AP communication, from the APs present in the vicinity of the master AP. However, if a plurality of APs is present in the vicinity of the master AP and the master AP sequentially communicates with the plurality of APs on one-on-one basis, it takes a long time to receive information from all the APs.

CITATION LIST

Patent Literature

PTL 1: Japanese Patent Laid-Open No. 2018-50133

SUMMARY OF THE INVENTION

Accordingly, the present invention is directed to reducing time required for a communication device that operates as an access point to receive necessary information from a plurality of communication devices that operate as an access point.

According to an aspect of the present invention, a communication device that operates as an access point in a communication network includes generation means for generating a frame including first information and second information, the first information indicating that the communication device requests each of a plurality of other communication devices configured to operate as an access point in a communication network to transmit information about the own device, the second information indicating a frequency component available for the plurality of other communication devices, transmission means for transmitting the frame generated by the generation means to each of the plurality of other communication devices, and reception means for receiving a response frame transmitted from each of the plurality of other communication devices in parallel in response to the frame in the frequency component indicated by the second information using Orthogonal Frequency Division Multiple Access (OFDMA), the response frame including information about each of the plurality of other communication devices.

According to another aspect of the present invention, a communication device that operates as an access point in a communication network includes generation means for generating a frame including first information and second information, the first information indicating that the communication device requests each of a plurality of other communication devices configured to operate as an access point in a communication network to transmit data, the second information indicating a frequency component available for the communication device configured to operate as the access point, transmission means for transmitting the frame generated by the generation means to each of the plurality of other communication devices, and reception means for receiving a response frame transmitted from each of the plurality of other communication devices in parallel in response to the frame in the frequency component indicated by the second information using Orthogonal Frequency Division Multiple Access (OFDMA), the response frame including information about each of the plurality of other communication devices.

According to another aspect of the present invention, a communication device that operates as an access point in a communication network includes reception means for receiving, from another communication device, a frame including first information and second information, the first information indicating that the other communication device configured to operate as an access point in a communication network requests the communication device to transmit information about the own device, the second information indicating a frequency component available for the communication device, and transmission means for transmitting a response frame including information about the communication device as a response to the frame received by the reception means in the frequency component indicated by the second information using Orthogonal Frequency Division Multiple Access (OFDMA).

According to another aspect of the present invention, a communication device that operates as an access point in a communication network includes reception means for receiving, from another communication device, a frame including first information and second information, the first information indicating that the other communication device configured to operate as an access point in a communication network requests the communication device to transmit data, the second information indicating a frequency component available for a communication device configured to operate as the access point, and transmission means for transmitting, in parallel, a response frame including information about the communication device as a response to the frame received by the reception means in the frequency component indicated by the second information using Orthogonal Frequency Division Multiple Access (OFDMA).

Further features of the present invention will become apparent from the following description of exemplary embodiments with reference to the attached drawings.

BRIEF DESCRIPTION OF THE DRAWINGS

FIG. 3 is a diagram illustrating an example of a trigger frame format.

FIG. 4 is a diagram illustrating an example of a frame format of a response frame for the trigger frame.

FIG. 5 is a flowchart illustrating processing to be executed by a communication device 100 as a master AP in an exemplary embodiment of the present invention.

DESCRIPTION OF THE EMBODIMENTS

Exemplary embodiments of the present invention will be described in detail below with reference to the accompanying drawings. Note that configurations described in the following exemplary embodiments are merely examples and the present invention is not limited to the illustrated configurations.

Figure 1:
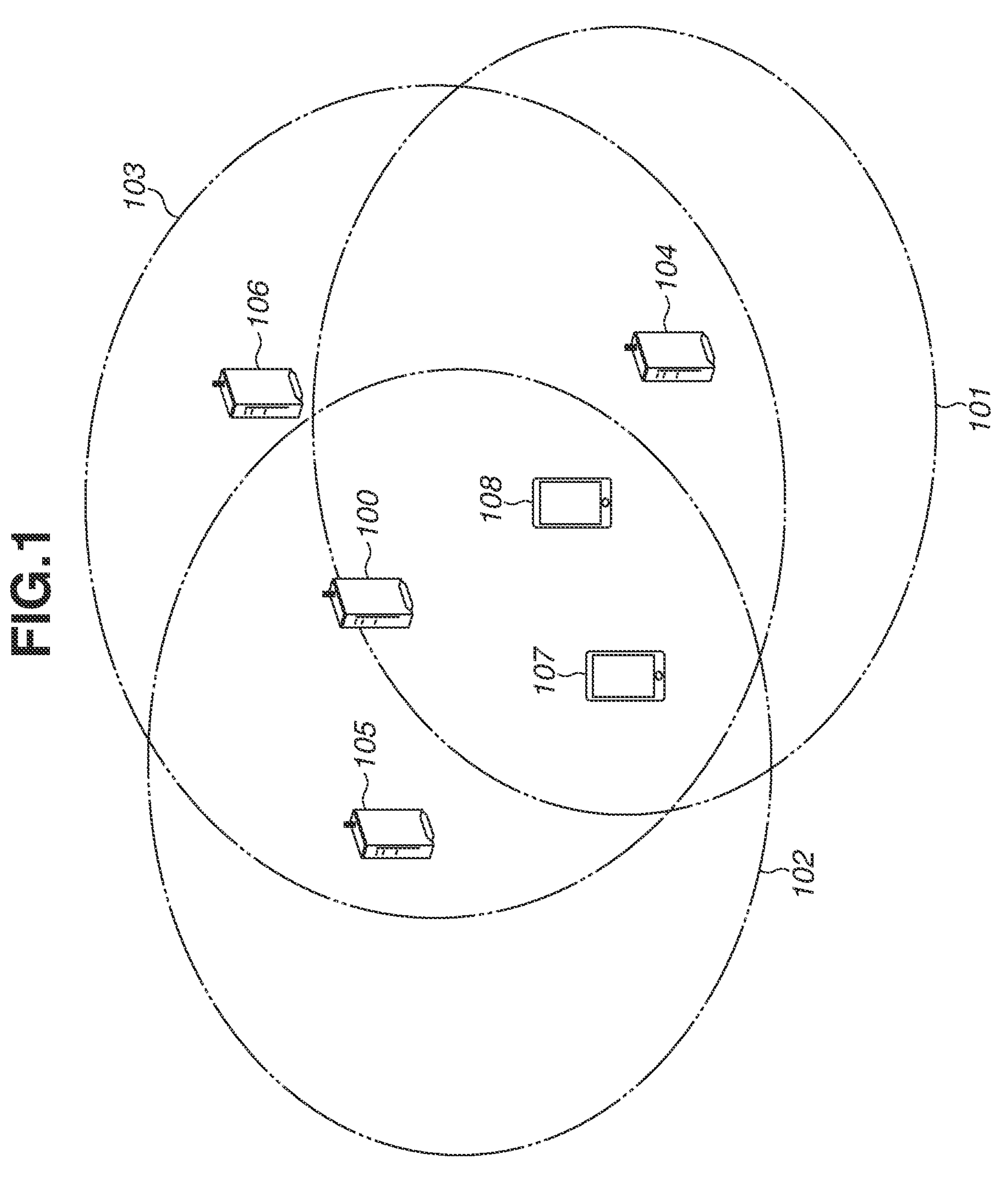
FIG. 1 is a diagram illustrating a configuration of networks to which a communication device 102 belongs.

FIG. 1 illustrates a configuration of a communication network constructed by a communication device 100 according to an exemplary embodiment of the present invention. A communication device 104 is an access point (hereinafter referred to as AP) including a function of constructing a wireless communication network 101. A communication device 105 is an AP including a function for constructing a wireless communication network 102. A communication device 106 is an AP including a function for constructing a wireless communication network 103. Each of a communication device 107 and a communication device 108 is a station (hereinafter referred to as STA) including a function for participating in the wireless communication networks 101, 102, and 103. In the present exemplary embodiment, the communication device 100 functions as a master AP that manages the other APs, and the communication devices 104 to 106 are APs that are present in the vicinity of the master AP. A slave AP is determined from among the communication devices 104 to 106.

The communication devices 100 and 104 to 108 are configured to execute wireless communication in compliance with the IEEE 802.11be standard. Note that IEEE stands for Institute of Electrical and Electronics Engineers. The communication devices 104 to 108 are configured to perform communication in frequency bands of 2.4 GHz, 5 GHz, and 6 GHz. The communication devices 100 and 104 to 108 are configured to perform communication with bandwidths of 20 MHz, 40 MHz, 80 MHz, 160 MHz, and 320 MHz.

The communication devices 100 and 104 to 108 perform OFDMA communication in compliance with the IEEE 802.11be standard, thereby achieving multi-user (MU) communication to multiplex a plurality of user signals. OFDMA stands for Orthogonal Frequency Division Multiple Access. In OFDMA communication, a resource unit (RU), which is a part of divided frequency components, is uniquely allocated to each communication device, and carrier waves from STAs are orthogonal to each other. Accordingly, each AP can communicate with a plurality of communication devices in parallel.

Note that the communication devices 100 and 104 to 108 are compliant with the IEEE 802.11be standard, and may also be compliant with the legacy standards that are standards prior to the IEEE 802.11be standard. Specifically, the communication devices 100 and 104 to 108 may be compliant with at least one of the IEEE 802.11 a/b/g/n/ac/ax standards. The communication devices 100 and 104 to 108 may be compliant not only with the IEEE 802.11 series standards, but also with other communication standards such as Bluetooth®, Near Field Communication (NFC), Ultra Wide Band (UWB), ZigBee, and Multi Band OFDM Alliance (MBOA). Note that NFC stands for Near Field Communication. UWB stands for Ultra Wide Band. MBOA stands for Multi Band OFDM Alliance. UWB includes a wireless USB, Wireless 1394, and WiNET. The communication devices 100 and 104 to 108 may be compliant with communication standards for wired communication such as a wired LAN.

Specific examples of the communication devices 100 and 104 to 106 include a wireless LAN router and a personal computer (PC). However, the communication devices 100 and 104 to 106 are not limited to these examples. The communication devices 104 to 106 may be information processing devices such as wireless chips configured to execute wireless communication in compliance with the IEEE 802.11be standard. Specific examples of the communication devices 107 and 108 include a camera, a tablet, a smartphone, a PC, a mobile phone, and a video camera. However, the communication devices 107 to 108 are not limited to these examples. The communication devices 107 and 108 may be information processing devices such as wireless chips configured to execute wireless communication in compliance with the IEEE 802.11be standard. While the wireless networks illustrated in FIG. 1 include three APs and two STAs, the number of APs and the number of STAs are not limited to this example.

Figure 2:
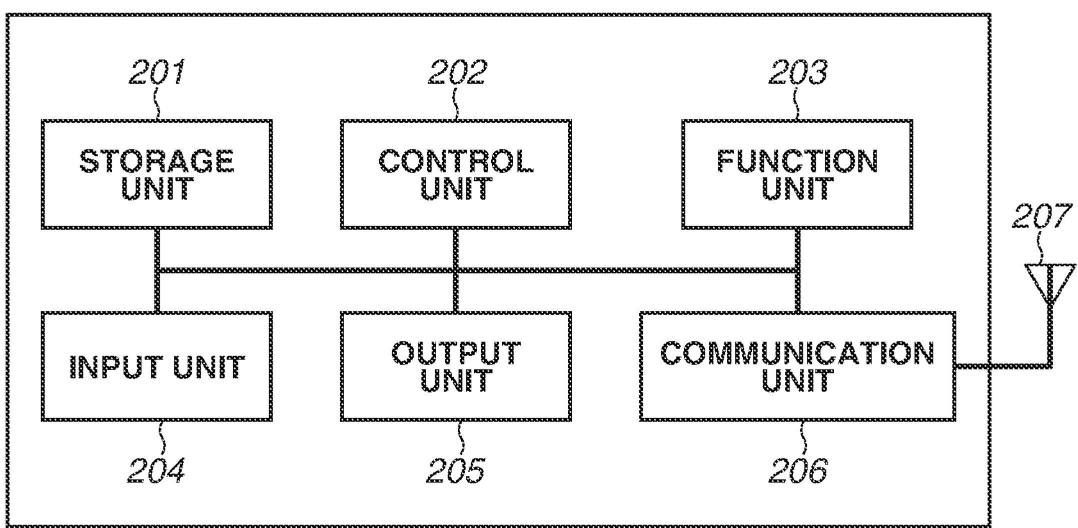
FIG. 2 is a block diagram illustrating a hardware configuration of communication devices 102 to 106.

FIG. 2 illustrates a hardware configuration of the communication devices 100 and 104 to 108 according to the present exemplary embodiment. The communication device 100 includes a storage unit 201, a control unit 202, a function unit 203, an input unit 204, an output unit 205, a communication unit 206, and an antenna 207.

The storage unit 201 is composed of one or more memories such as a Read-Only Memory (ROM) and a Random Access Memory (RAM), and stores programs for performing various operations to be described below and various information such as communication parameters for wireless communication. ROM stands for Read-Only Memory, and RAM stands for Random Access Memory. Note that as the storage unit 201, not only memories, such as a ROM and a RAM, but also storage media such as a flexible disk, a hard disk, an optical disk, a magneto-optical disk, a CD-ROM, a CD-R, a magnetic tape, a non-volatile memory card, and a DVD may be used. The storage unit may include a plurality of memories.

The control unit 202 is composed of one or more processors such as a Central Processing Unit (CPU) and a Micro Processing Unit (VIPU). Computer programs stored in the storage unit 201 are executed to thereby control the entire communication device 100. CPU stands for Central Processing Unit, and MPU stands for Micro Processing Unit. Note that the control unit 202 may control the entire communication device 100 by causing computer programs stored in the storage unit 201 and an operating system (OS) to operate in cooperation. The control unit 202 generates data and signals to be transmitted in communication with other communication devices. The control unit 202 may include a plurality of processors, such as a multicore, and the plurality of processors may control the entire communication device 100.

The control unit 202 controls the function unit 203 to execute predetermined processing such as image capturing, printing, or projection. The function unit 203 is hardware for each AP and each STA to execute predetermined processing. For example, if each AP and each STA function as a camera, the function unit 203 is an image capturing unit and performs image capturing processing. For example, if each AP and each STA function as a printer, the function unit 203 is a printing unit and performs printing processing. For example, if each AP and each STA function as a projector, the function unit 203 is a projection unit and performs projection processing. Data to be processed by the function unit 203 may be data stored in the storage unit 201 or data communicated with other APs and STs via the communication unit 206 to be described below.

The input unit 204 receives various operations from a user. The output unit 205 performs various output processing for the user via a monitor screen or a speaker. In this case, the output processing performed by the output unit 205 may include display on a monitor screen, audio output via a speaker, and vibration output. Note that the input unit 204 and the output unit 205 may be implemented as a single module, like a touch panel. The input unit 204 and the output unit 205 may be integrated with the communication device 100, or may be separated from the communication device 100.

The communication unit 206 controls wireless communication in compliance with the IEEE 802.11 series standards. The communication unit 206 may also control wired communication via a wired LAN or the like. The communication unit 206 controls the antenna 207 and transmits and receives signals for wireless communication generated by the control unit 202. Note that if the communication device 100 is compliant not only with the IEEE 802.11be standard, but also with the Near Field Communication (NFC) standard, the Bluetooth® standard, and the like, the communication device 100 may control wireless communication in compliance with these communication standards. If the communication device 100 is configured to execute wireless communication in compliance with a plurality of communication standards, the communication device 100 may include communication units and antennas that are compliant with the respective communication standards. The communication device 100 communicates data, such as image data, document data, and video data, with the communication devices 107 and 108 via the communication unit 206.

FIG. 3 illustrates an example of a format of a trigger frame in the present exemplary embodiment. The trigger frame is a frame to prompt each STA to transmit data to each AP using the RUs that are allocated to the STAs, respectively, by each AP. Each STA uses the RUs allocated by each AP, which enables each STA to transmit data to the APs in parallel.

Figure 9:
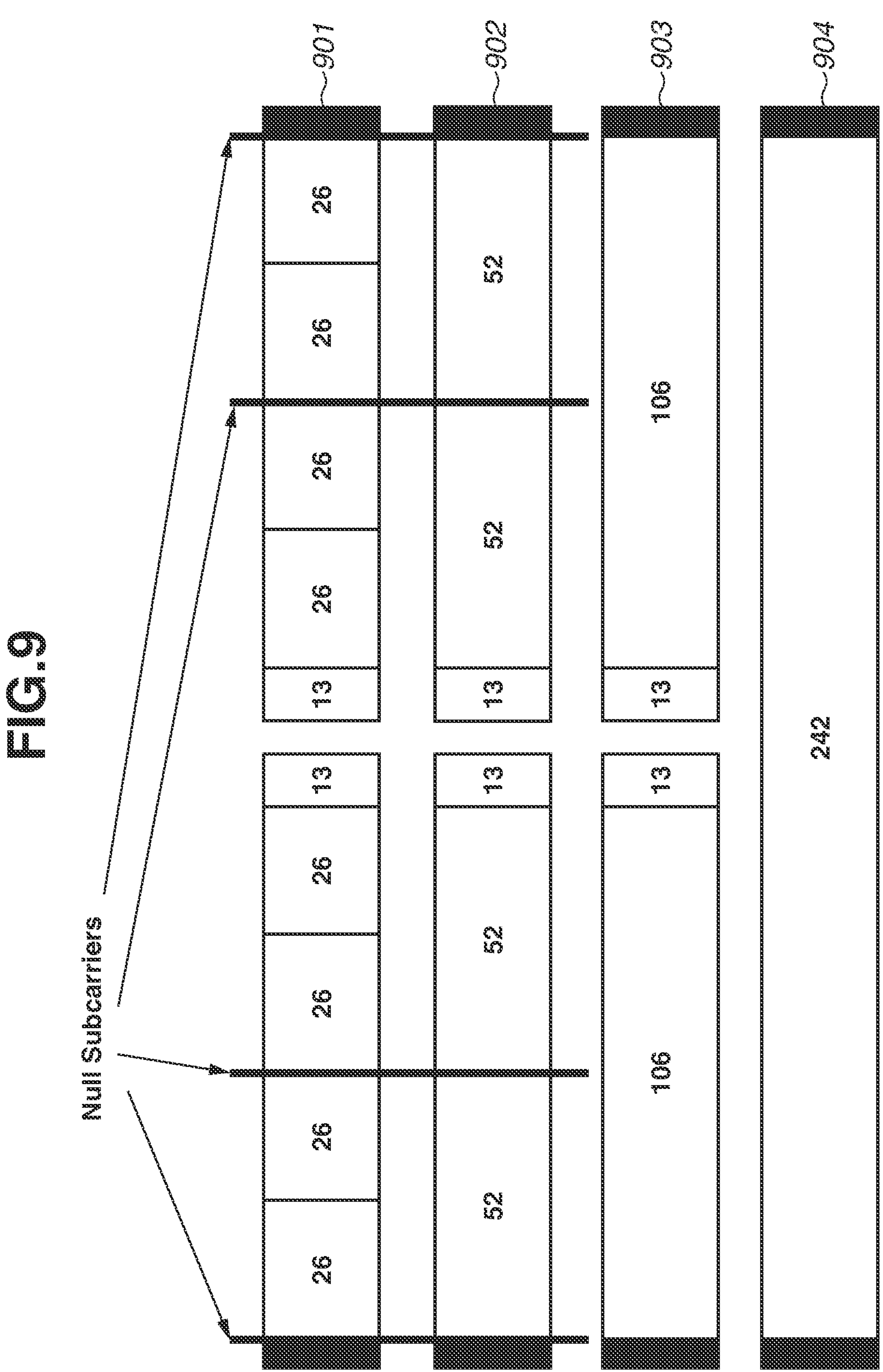
FIG. 9 illustrates the size of a RU allocated by an AP in a bandwidth of 20 MHz.

FIG. 9 illustrates the size of a RU to be allocated by each AP. Note that FIG. 9 illustrates the allocation of an RU when the communication device 100 uses a bandwidth of 20 MHz. The RU allocation illustrated in FIG. 9 is performed in an RU allocation sub-field to be described below. 901 denotes the size of the RU to be allocated to nine STAs. The RU is obtained by dividing 20 MHz into 256 subcarriers on a frequency axis and collecting a plurality of subcarriers from among the divided subcarriers. In this case, the size of the RU to be allocated by an AP for each STA is “26”. The size of the RU indicates the number of subcarriers to be used for each RU. The size “26” of the RU indicates that 26 subcarriers are used. Note that 902 denotes the size of the RU to be allocated to five STAs, 903 denotes the size of the RU to be allocated to three STAs, and 904 denotes the size of the RU to be allocated to one STA.

In the present exemplary embodiment, FIG. 3 illustrates a frame to be transmitted from the communication device 100 to each of the communication devices 104 to 106 that are APs present in the vicinity of the communication device 100 (the APs are hereinafter referred to as neighbor APs). The frame indicates transmission of information about the communication devices 104 to 106. In this case, the neighbor APs indicate APs that are present within a range where the communication device 100 can receive a beacon frame from the APs.

Fields and sub-fields 301 to 313 illustrated in FIG. 3 are based on a format specified in the IEEE 802.11ax. Trigger Type 309 in Common Info 305 designates the type of trigger by the trigger frame. Length 310 represents a common communication period for all communication devices. BW 311 is a field including information indicating the bandwidth of a channel to be used when data is transmitted from each neighbor AP to the master AP. For example, assume that BW 311 includes “0”, “1”, and “2” as sub-field values and the frequency bands corresponding to these values are 20 MHz, 40 MHz, and 80 MHz, respectively. In this case, the subfield value "1" in BW 311 indicates that the frequency bandwidth available for each neighbor AP is 40 MHz. If the sub-field value in BW 311 is greater than or equal to "1", each neighbor AP may transmit information using the frequency bandwidth corresponding to the value or less in the case of transmitting information about the neighbor AP to the communication device 100. For example, if the value of BW 311 indicates "2", each neighbor AP may transmit information using the bandwidths of 20 MHz, 40 MHz, and 80 MHz.

Table 1 illustrates the correspondence between each Trigger Type sub-field value and each trigger type in Trigger Type 309.

TABLE 1

| Sub-Field Value | Trigger Type |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | Multi-AP Group Formation Trigger Frame |
| 9-15 | Reserved |

Trigger Type is represented by four bits. In the present exemplary embodiment, the sub-field value "8" in Trigger Type indicates that each neighbor AP transmits information about the own device to the master AP.

User Info 306 #1 to 306 #N each include Association ID (AID) 312 as an identifier and RU Allocation 313. Each AID 312 is represented by 12 bits. When the AID that is identification information assigned when a connection is established is stored in AID 312, the lower 12 bits of the AID are stored. Accordingly, Table 2 illustrates the sub-field in AID 312 as AID12 sub-field. AID 312 will be described below with reference to Table 2.

In RU Allocation 313, the RU that is a frequency component to be used to transmit information about each neighbor AP to the master AP is allocated. A specific RU allocation method is illustrated in FIG. 9 described above. There are two types of RUs, i.e., a RU that can be used only by a communication device in which the last 12 digits of the AID value, which is identification information assigned when a connection is established, match the AID sub-field value, and a Random Access-Resource Unit (RA-RU) that can be used by a plurality of communication devices. It can be assumed that the RA-RU is allocated to, for example, a communication device which has not established a connection and to which AID is not assigned, a communication device that has established a connection and has been restored from a sleep state, or a communication device that has low priority.

Table 2 illustrates the relationship between the sub-field value of AID 312 in User Info 306 and the definition of the value.

TABLE 2

| AID12 Sub-Field | Contents |
|---|---|
| 0 | User Info allocates one or more continuous RA-RUs to STAthat has established a connection |
| 1-2007 | User Info designates an address to STA that has established a connection and having an AID equivalent to AID12 sub-field value. |
| 2008-2044 | Reserved |
| 2045 | User Info allocates one or more continuous RA-RUs to STA that has not established a connection |
| 2046 | No RU is allocated |
| 2047 | User Info allocates one or more continuous RA-RUs to AP that has not established a connection |
| 2048-4094 | Reserved |

Note that the STAs illustrated in Table 2 also include APs. Each neighbor AP determines whether User Info is information dedicated to the own device based on identification information corresponding to the value stored in the AID12 sub-field.

The values "1-2007" included in the AID12 sub-field indicate User Info for the STA in which the last 12 digits of the AID assigned when a connection is established match the AID12 sub-field value. The value "2045" included in the AID12 sub-field indicates User Info for the STA which has not established a connection and to which AID is not assigned. The value "2047" of the AID12 sub-field is newly specified field value. The value "2047" included in the AID12 sub-field indicates User Info for the AP which has not established a connection and to which AID is not assigned.

If the communication device 100 and each neighbor AP have established a connection, a number of pieces of User Info 306 #1 to 306 #N corresponding to the number of neighbor APs are included. However, if the communication device 100 and each neighbor APs have not established a connection, User Info in which the value "2045" or "2047" is stored in the AID12 sub-field is shared.

Further, the communication device 100 manages OFDMA random access Back-Off (OBO) that functions as a timer to prevent the neighbor APs from competing with each other to use the RU or RA-RU allocated by the communication device 100. OBO is randomly allocated by the communication device 100. If the value obtained by subtracting the number of RA-RUs allocated by the communication device 100 from an initial value of OBO is equal to or less than the number of RA-RUs allocated by the communication device 100, each neighbor AP transmits a response frame using the allocated RA-RU. If the value obtained by subtracting the number of RA-RUs allocated by the communication device 100 from the initial value of OBO is greater than the number of RA-RUs allocated by the communication device 100, the number of neighbor APs is reduced by the number of RA-RUs allocated by the communication device 100, and the neighbor APs wait for the subsequent transmission of a trigger frame.

In the present exemplary embodiment, if the communication device 100 and each neighbor AP have not established a connection, the communication device 100 sets the Trigger Type sub-field value to "8" to indicate to each neighbor AP to transmit information about the own device to the communication device 100. Further, the communication device 100 sets the AID sub-field value to "2045" or "2047" to allocate the RU to be used for each neighbor AP to transmit information. If the communication device 100 and each neighbor AP have not established a connection, the AID is not assigned to the neighbor AP. Accordingly, the communication device 100 sets the AID sub-field value to "2045" or "2047" so that the neighbor AP can transmit information using the RA-RU. If the AID12 sub-field value is set to "2045", the STA that has not established a connection can also be used as illustrated in Table 2, so that the RA-RU that can be used by the neighbor AP can compete with the STA. However, if the AID12 sub-field value is set to "2047", the field indicates the RA-RU that can be used only by the AP that has not established a connection, so that the neighbor AP can use the RA-RU without competing with the STA.

Also, in the case where the communication device 100 and each neighbor AP have established a connection, the communication device 100 sets the Trigger Type sub-field value to "8" to indicate that information about each neighbor AP is transmitted to the communication device 100. Further, the communication device 100 sets the AID sub-field value to the last 12 digits of the value of the AID, which is assigned when a connection is established, so as to allocate the RU to be used for the neighbor APs to transmit information about the own device.

Additionally, in the case where the communication device 100 and each neighbor AP have not established a connection, also when the Trigger Type sub-field value is set to "0" and the AID sub-field value is set to "2047", the frame indicates that the neighbor AP transmits information about the own device to the communication device 100. In the IEEE 802.11ax standard, if the Trigger Type sub-field value is set to "0" and AID sub-field values 0-2046 illustrated in Table 2 are stored, the frame indicates transmission of Up Link Multi-User (UL MU). However, it can be interpreted that when the Trigger Type sub-field value is set to "0" and the AID12 sub-field value "2047" that is newly specified as the AID sub-field value is stored, the frame indicates that the neighbor AP transmits information about the own device to the communication device 100.

When the communication device 100 transmits the trigger frame, the communication device 100 can select the Trigger Type sub-field value depending on the connection status of each neighbor AP or the like, or the user can set the Trigger Type sub-field value. For example, if the neighbor AP that has established a connection is present, the Trigger Type sub-field value may be set to "8", and if there is no neighbor AP that has established a connection, the Trigger Type sub-field value may be set to "0".

FIG. 4 illustrates a Multi-AP Group formation Response frame Action Field format as an example of the response frame for the trigger frame in the present exemplary embodiment. The response frame is a format that is compliant with a management frame such as an action frame.

BSSID2 409 includes information about BSSID of each neighbor AP, and Buffer Status 410 includes information about Buffer Status of each neighbor AP. The master AP can recognize the data accumulation status in a buffer of each neighbor AP based on Buffer Status. Information indicating whether to participate in Multi-AP can be stored in Multi-AP participation 411. The number of STAs that have established a connection with the neighbor APs is stored in Number of STA 412, and a list of AIDs assigned to the STAs that have established a connection is stored in AID List 413. Further, information about the intensity of the received trigger frame is stored in Trigger frame signal intensity 414. The distance between the communication device 100 and each neighbor AP can be recognized based on Trigger frame signal intensity 414. The communication device 100 determines the slave AP based on information about the response frame for the trigger frame.

FIG. 5 is a flowchart illustrating a processing flow to be performed such that the control unit 202 executes programs stored in the storage unit 201 of the communication device 100 serving as the master AP. This flowchart illustrates a processing flow in which the communication device 100 transmits the trigger frame to indicate to each neighbor AP to transmit information about the own device and determines the slave AP based on information about the received response frame.

This flowchart is started when the wireless LAN function is started, for example, when the user makes a setting to perform Multi-AP communication in the communication device 100, when the communication device 100 is powered on, or when the wireless LAN function of the communication device 100 is turned on. Alternatively, this flowchart may be started in a case where the communication device 100 cannot receive any beacon frame from the slave AP, for example, in a case where Multi-AP communication has been established but the slave AP with which Multi-AP communication is performed has moved outside of a communication range.

In step S501, the communication device 100 monitors a beacon frame transmitted from each neighbor AP. Next, in step S502, the communication device 100 determines whether the beacon frame transmitted from the neighbor AP is received. In step S502, if it is determined that the beacon frame is received, in step S503, it is determined whether a predetermined time has elapsed. After the lapse of the predetermined time, a plurality of beacon frames can be received. In step S502, if it is determined that the beacon frame is not received, the processing returns to step S501 to monitor the beacon frame from each neighbor AP again. In step S503, if it is determined that the predetermined time has not elapsed, the processing returns to step S501 again to monitor the beacon frame from each neighbor AP. In step S503, if it is determined that the predetermined time has elapsed, in step S504, the communication device 100 receives the beacon frame and determines whether two or more neighbor APs are detected. The number of neighbor APs is managed in the function unit of the communication device 100. If two or more neighbor APs are present, in step S505, the communication device 100 transmits the trigger frame to the neighbor AP from which the beacon frame is received. This trigger frame includes information indicating to the neighbor AP to transmit information about the own device and information about the RU to be used when information about the neighbor AP is transmitted to the communication device 100. In this case, information indicating to each neighbor AP to transmit information about the own device is included in the Trigger Type sub-field of the Common Info field, and information about the RU is included in RU Allocation of the User Info field. Note that if it is detected that the neighbor AP is not compliant with 11be from the information about the received beacon frame, there may be no need to transmit the trigger frame.

In step S506, the communication device 100 determines whether the response frame is received. Examples of the information about the neighbor AP included in the response frame include a reception signal intensity regarding the trigger frame received by the neighbor AP, information about the STA that has established a connection with the neighbor AP, and information indicating whether to participate in Multi-AP communication. A channel to be used when the communication device 100 receives the response frame from the neighbor AP is determined based on beacon frame information about the neighbor AP that is received by the communication device 100. The RU to be used when the neighbor AP transmits the response frame may be allocated to each communication device from one channel, or may be allocated from a plurality of channels. For example, in a case where each neighbor AP transmits information about the neighbor AP in a frequency bandwidth of 80 MHz, four channels with a bandwidth of 20 MHz are used. The communication devices 104 to 106 can use a plurality of RUs or RA-RUs from one of the four channels to be used in this case, and can also use RUs or RA-RUs from a plurality of different channels. The frequency bandwidth and the number of channels to be used in this case are not limited to this example. The neighbor APs that do not participate in Multi-AP communication need not necessarily transmit the response frame to the communication device 100 in response to the trigger frame.

In step S506, if it is determined that the communication device 100 has received the response frame, in step S509, the communication device 100 determines the slave AP from among the neighbor APs based on the information transmitted from the neighbor APs. Examples of the slave AP determination method can include a method of selecting an AP with a higher radio field intensity of the trigger frame received by the neighbor AP, and a method of selecting the AP with which a larger number of STAs have established a connection. However, the slave AP determination method is not limited to these examples. As the selection method, for example, the neighbor AP that is determined to have a radio field intensity that is indicated by Trigger frame signal intensity 414 in the response frame transmitted to the communication device 100 and is higher than a reference value may be preferentially selected. The reference value may be set by the user. If the reference value is not set by the user, a default setting held in the storage unit 201 is used. An upper limit of the number of slave APs may be determined in advance, and there may be no need to set all neighbor APs as slave APs.

In step S506, if it is determined that the communication device 100 has not received the response frame, the processing is terminated. If it is determined that the response frame is not received, for example, the neighbor AP may be a communication device that is not compliant with the 11be standard, or the neighbor AP may be compliant with the 11be standard but having determined not to participate in Multi-AP communication and the neighbor AP does not transmit the response frame to the communication device 100.

In step S510, the communication device 100 transmits a slave AP determination notification frame to the AP that has been determined to be the slave AP, to thereby provide a notification that the AP has been determined to be the slave AP. If an AP has not been determined to be the slave AP, the slave AP determination notification frame indicating that the AP has not been determined to be the slave AP may be transmitted, or may not be transmitted.

In step S504, if two or more neighbor APs are not present, that is, if only one neighbor AP is present, in step S507, the communication device 100 transmits a frame to the neighbor AP. Examples of the frame include a frame that is compliant with a management frame such as an action frame. The frame to be transmitted from the communication device 100 to each neighbor AP includes information indicating transmission of information about the neighbor AP to the communication device 100. If one neighbor AP is present, there is no need to transmit and receive information about a plurality of communication devices in parallel, which eliminates the need for using the trigger frame and OFDMA.

In step S508, the communication device 100 determines whether the response frame is received. In step S508, if it is determined that the response frame is received, then in step S509, the communication device 100 determines the slave AP from among the neighbor APs based on the received information. The slave AP determination method is described above.

In step S510, if it is determined that the response frame is not received, the processing is terminated.

Specific examples of the processing illustrated in the flowchart of FIG. 5 will be described below with reference to FIGS. 6 to 8.

Figure 6:
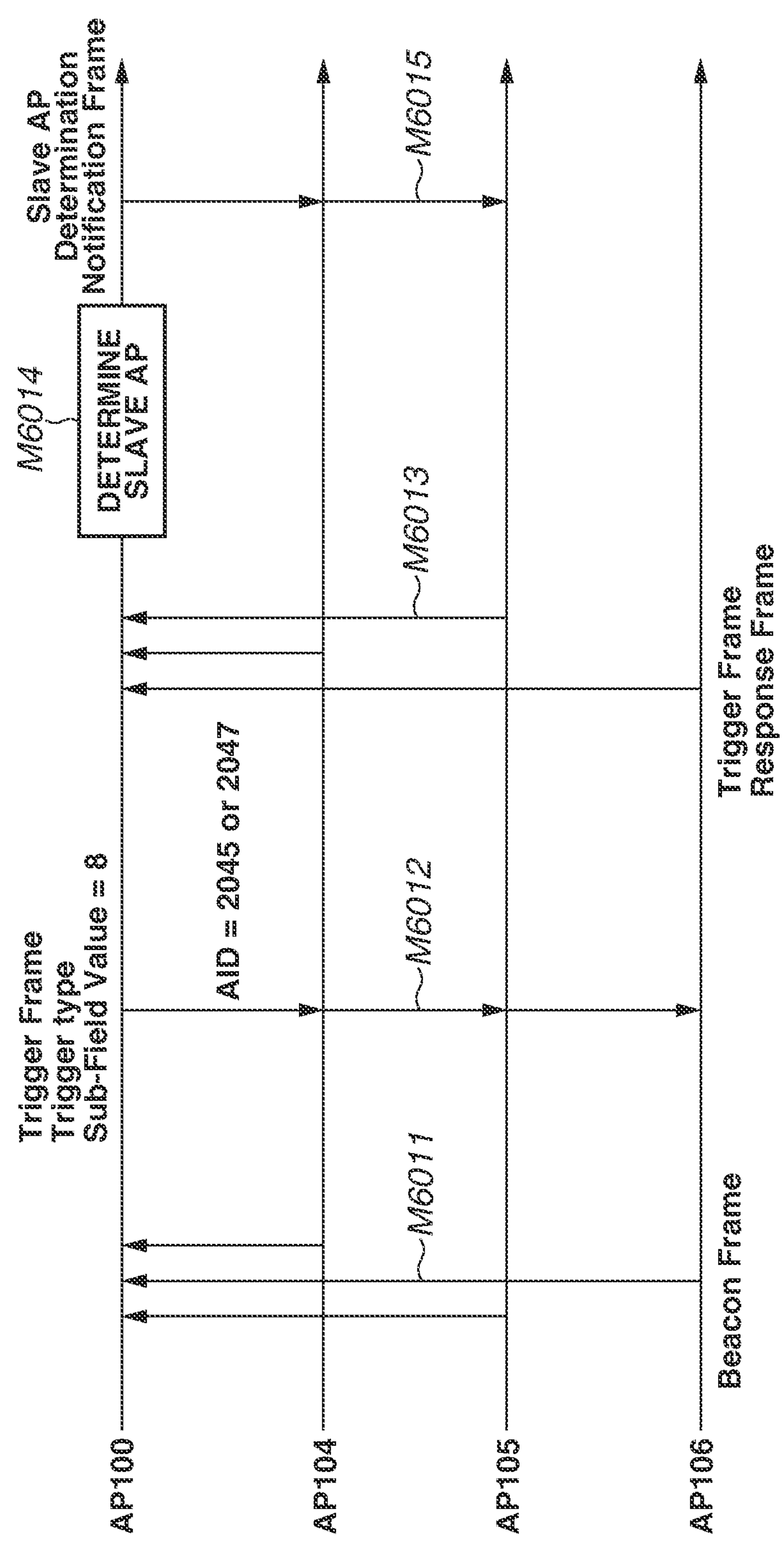
FIG. 6 is a sequence diagram for the communication device 100 to determine a slave AP.

FIG. 6 is a sequence diagram illustrating that the communication device 100 stores a newly specified Trigger Type sub-field value to indicate to the communication devices 104 to 106 to transmit information about the own device to the communication device 100, and determines the slave AP based on the information. The Trigger Type sub-field value in the trigger frame is set to "8" and the AID12 sub-field value is set to "2045" or "2047", and the trigger frame is transmitted to the communication devices 104 to 106, which are neighbor APs, to thereby indicate to the communication devices 104 to 106 to transmit information about the own device.

The communication device 100 receives the beacon frame transmitted from each of the communication devices 104 to 106 (M6011), thereby detecting the presence of neighbor APs. If the beacon frame is received, the Trigger Type sub-field value is set to "8", thereby generating a Multi-AP group formation trigger frame and transmitting the Multi-AP group formation trigger frame to the communication devices 104 to 106 (M6012). In the present exemplary embodiment, the communication device 100 and the communication devices 104 to 106 have not established a connection, and thus the AID is not assigned to the communication devices 104 to 106. Accordingly, when the AID12 sub-field value is set to "2045" or "2047", the communication devices 104 to 106 transmit information about the own device to the communication device 100 using the RU that can be used by the communication device to which AID is not assigned (M6013).

The communication device 100 determines the slave AP based on the received information about the communication devices 104 to 106 (M6014). The sequence diagram illustrated in FIG. 6 illustrates a case where the communication device 104 and the communication device 105 are determined to be the slave AP. In M6015, the slave AP determination notification frame is transmitted to each of the communication devices 104 and 105. Since the communication device 106 is not determined to be the slave AP, the slave AP notification is not transmitted. After the slave AP is determined, the communication device 100 may periodically transmit the same trigger frame to some or all of slave APs, and the communication device 100 may obtain the latest information about the slave APs.

Figure 7:
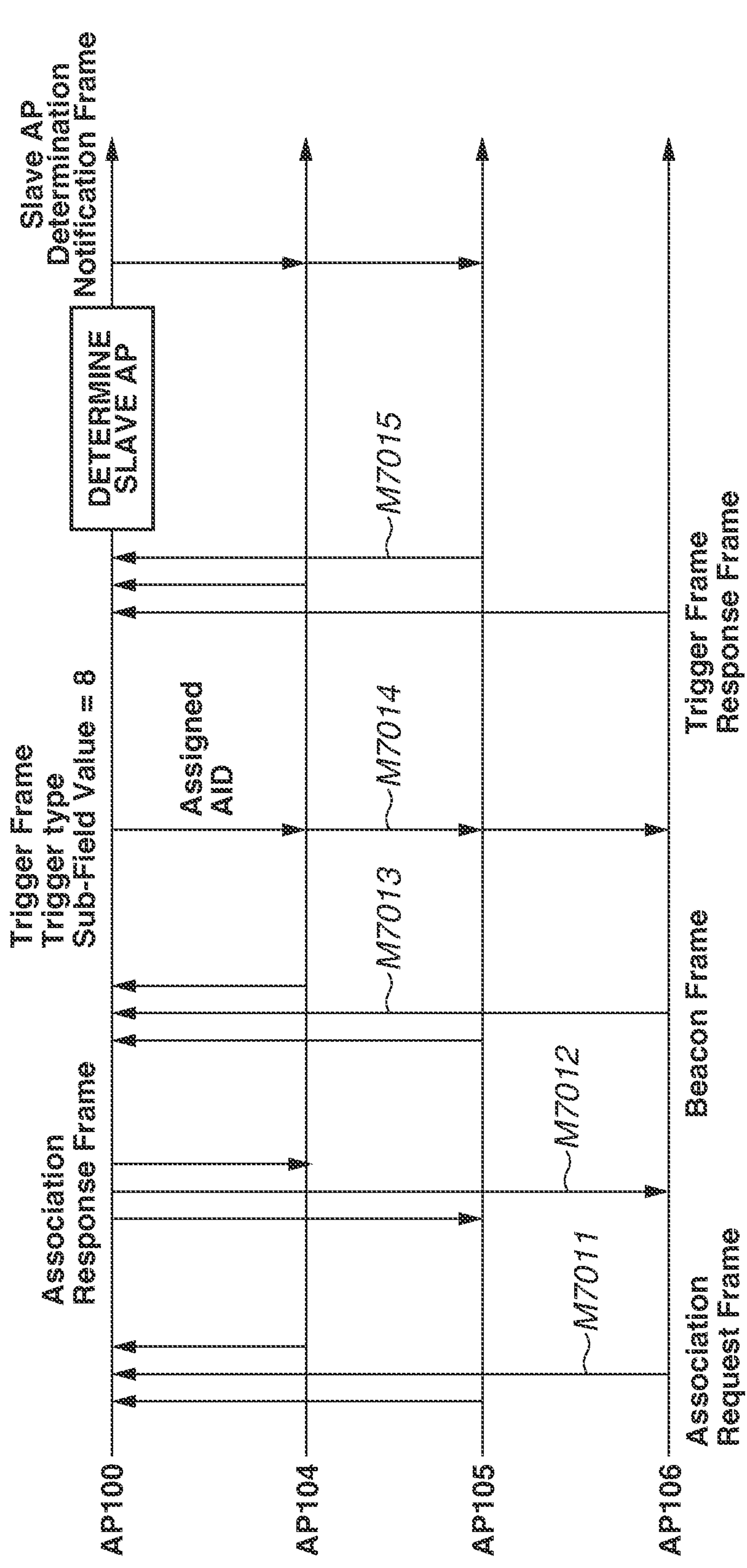
FIG. 7 is a sequence diagram for the communication device 100 to determine the slave AP.

FIG. 7 is a sequence diagram illustrating that the communication device 100 and the communication devices 104 to 106 have already established a connection before slave AP determination processing is started and the communication device 100 determines the slave AP if the AID is assigned to each of the communication devices 104 to 106. The communication device 100 sets the Trigger Type sub-field value to "8", stores the already assigned AID value, and transmits the trigger frame, thereby indicating to the communication devices 104 to 106 to transmit information about the own device to the communication device 100.

The communication devices 104 to 106 transmit an Association Request frame to the communication device 100 (M7011). The communication device 100 transmits an Association Response frame in response to the received Association Request frame (M7012). As a result, the communication device 100 and the communication devices 104 to 106 establish a connection.

If the beacon frame is received (M7013), the Trigger Type sub-field value is set to "8" to generate the Multi-AP group formation trigger frame and transmit the Multi-AP group formation trigger frame to the communication devices 104 to 106 (M7014). In the present exemplary embodiment, the trigger frame is transmitted using the reception of the beacon frame as a trigger, but instead may be transmitted using the transmission of the Association Response frame as a trigger.

Values assigned to the communication devices 104 to 106 that have established a connection are stored in the AID12 sub-field value of AID field 312 included in User Info Field A number of sets of User Info 306 corresponding to the number of neighbor APs that have established a connection with the communication device 100 are included in AID field 312. The communication devices 104 to 106 that have received the trigger frame transmit information about the own device to the communication device 100 (M7015).

The above-described steps are carried out after the slave AP is determined.

In the present exemplary embodiment, since the communication device 100 and the communication devices 104 to 106 have established a connection, information to be transmitted to the communication device 100 from the slave AP after the slave AP is determined also includes dynamically changing information. For example, the position of the slave AP varies and the distance between the communication device 100 and the slave AP increases, which disables the communication, or the channel performance between the slave AP and the STA varies depending on a variation in the position of the STA connected to the slave AP. The dynamically changing information can be obtained from the beacon frame information that is transmitted from the communication devices 104 to 106 and is received by the communication device 100.

Figure 8:
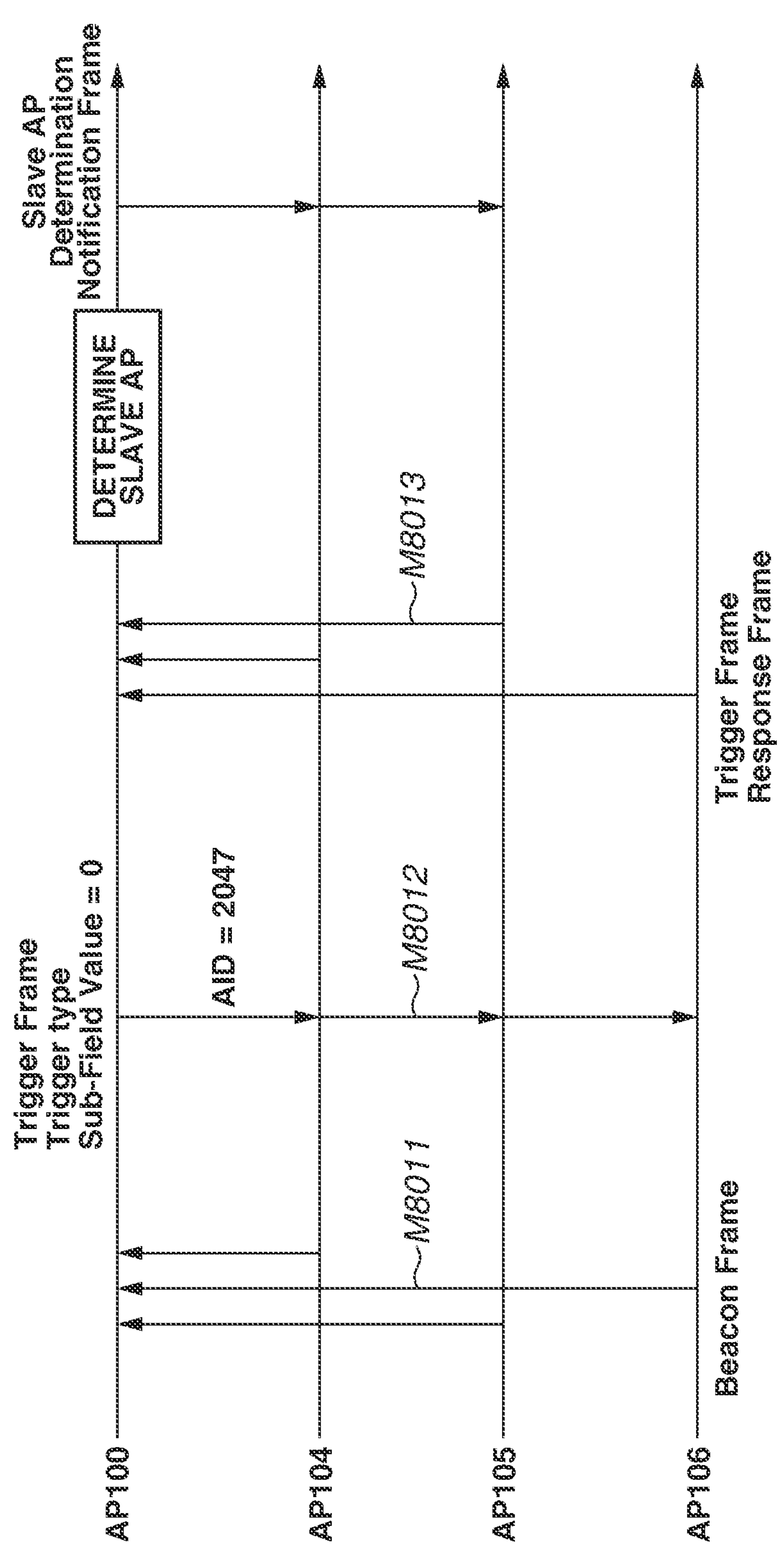
FIG. 8 is a sequence diagram for the communication device 100 to determine the slave AP.

FIG. 8 is a sequence diagram illustrating that the existing Trigger Type sub-field value is set to indicate transmission of information about the own device to the communication devices 104 to 106 and the communication device 100 determines the slave AP based on the information. The communication device 100 sets the Trigger Type sub-field value to "0" and sets the AID12 sub-field value to "2047", to thereby indicate for the communication devices 104 to 106 to transmit information about the own device to the communication device 100.

The communication device 100 receives the beacon frame transmitted from each of the communication devices 104 to 106 (M8011), thereby detecting the presence of neighbor APs. If the beacon frame is received, the communication devices 104 to 106 generate the trigger frame indicating transmission of information about the own device to the communication device 100, and transmits the trigger frame to each of the communication devices 104 to 106 (M8012). In the IEEE 802.11ax standard, the Trigger Type sub-field value "0" indicates the trigger frame for performing Up Link Multi-User (UL MU) transmission. However, when the Trigger Type sub-field value is "0" and the AID12 sub-field value is "2047", the communication devices 104 to 106 interpret that the frame indicates to the communication devices 104 to 106 to transmit information about the own device to the communication device 100. The communication devices 104 to 106 that have received the trigger frame transmits information about the own device to the communication device 100 using the RU designated by the communication device 100 (M8013).

The above-described steps are carried out after the slave AP is determined.

As described above, the communication device 100 according to the present exemplary embodiment transmits the trigger frame including information indicating to a plurality of neighbor APs to transmit information about the own device to the communication device 100 and information about the RU allocated to the plurality of neighbor APs. The communication device 100 receives information about the response frame in parallel in response to the trigger frame using OFDMA. Consequently, the time required for receiving necessary information can be reduced compared to a case where the communication device 100 sequentially communicates with the plurality of neighbor APs on one-on-one basis and information is received from the plurality of neighbor APs.

The reduction in the time required for receiving information from the plurality of neighbor APs enables the communication device 100 to efficiently select the slave AP and to start Multi-AP communication earlier.

Note that a recording medium that records a software program code for implementing the above-described functions may be supplied to a system or an apparatus, and the program code stored in the recording medium may be read out and executed by a computer (CPU, MPU) in the system or the apparatus. In this case, the program code read out from the storage medium implements the functions of the above-described exemplary embodiment, and the storage medium storing the program code constitutes the above-described apparatus.

As the storage medium for supplying the program code, for example, a flexible disk, a hard disk, an optical disk, a magneto-optical disk, a CD-ROM, a CD-R, a magnetic tape, a non-volatile memory card, a ROM, a DVD, and the like can be used.

The above-descried functions may be implemented not only by executing the program code read out by the computer, but also by performing some or all of the actual processes by an Operating System (OS) running on the computer based on an instruction from the program code. OS stands for Operating System.

Further, the program code read out from the storage medium is written into a memory included in a function extension board inserted into the computer, or a function extension unit connected to the computer. The above-described functions may be implemented by performing some or all of the actual processes by a CPU included in the function extension board or the function extension unit based on an instruction from the program code.

The present invention can also be implemented by processing in which a program for implementing one or more functions according to the above-described exemplary embodiments is supplied to a system or an apparatus via a network or a storage medium, and one or more processors in a computer of the system or the apparatus read out and execute the program. The present invention can also be implemented by a circuit (e.g., an ASIC) for implementing the one or more functions.

The present invention is not limited to the above-described exemplary embodiments, and various modifications and changes can be made without departing from the spirit and scope of the present invention. Accordingly, the following claims are attached to disclose the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a communication device transmits, to a plurality of other communication devices, a frame including first information for the communication device to indicate to a plurality of other communication devices to transmit information about the own device, and second information indicating a frequency component allocated to each of the plurality of other communication devices, and receives a response from the plurality of other communication devices in parallel using OFDMA, thereby reducing time required for receiving necessary information from the plurality of other communication devices.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device that operates as an access point (AP) in a communication network, the communication device comprising:

at least one memory storing instructions; and at least one processor that executes the instructions to cause the communication device to perform:

determining whether to transmit, to initiate a multiple AP (multi-AP) coordination, a frame that triggers Orthogonal Frequency Division Multiple Access (OFDMA) communication or a frame that does not trigger the OFDMA communication;

transmitting, to initiate the multi-AP coordination, the determined frame to other communication device as an access point; and receiving a response frame transmitted from the other communication device in response to the transmitted frame, the response frame including information indicating whether the other communication device participates in the multi-AP coordination or not, wherein in a case where a number of other communication device which is a candidate of a participant of the multi-AP coordination is less than two, it is determined to transmit the frame that does not trigger the OFDMA communication to initiate the multi-AP coordination, and in a case where the number of other communication device which is a candidate of a participant of the multi-AP coordination is equal to or more than two, it is determined to transmit the frame that triggers the OFDMA communication.

2. The communication device according to claim 1, wherein a communication device to operate under control of the communication device is determined from among the plurality of other communication devices based on the received information included in the response frame.

3. The communication device according to claim 1, wherein a trigger type information is included in a Common Info field of the transmitted frame, and information indicating a frequency component is included in a User Info field of the transmitted frame.

4. The communication device according to claim 3, wherein the trigger type information is indicated by 0 or 8.

5. The communication device according to claim 3, wherein the information indicating the frequency component is included in a resource unit (RU) allocation sub-field of a User Info field in the transmitted frame.

6. The communication device according to claim 5, wherein the information indicating the frequency component is information indicating an RU.

7. The communication device according to claim 1, wherein the frame that does not trigger the OFDMA communication is a management frame having an action frame format.

8. The communication device according to claim 1, wherein the frame that triggers the OFDMA communication includes a Trigger Type subfield and the frame that triggers the OFDMA communication initiates the multi-AP coordination, in a case where the Trigger Type subfield includes a value indicating a Multi-AP Group Formation Trigger Frame as the trigger type.

9. The communication device according to claim 1, wherein the frame that triggers the OFDMA communication includes a Trigger Type subfield and an AID12 subfield and the frame that triggers the OFDMA communication initiates the multi-AP coordination, in a case where the Trigger Type subfield includes a value indicating a Basic Trigger Frame as the trigger type and the AID12 subfield includes a value indicating that User Info allocates one or more continuous Random Access Resource Units (RA-RUs) to AP that has not established a connection with the communication device.

10. A communication method for communication between a first communication device configured to operate as an access point in a communication network and a second communication device as an access point different from the first communication device, the communication method comprising:

determining whether to transmit, to initiate a multiple AP (multi-AP) coordination, a frame that triggers Orthogonal Frequency Division Multiple Access (OFDMA) communication or a frame that does not trigger the OFDMA communication;

transmitting, to initiate the multi-AP coordination, the determined frame to the second communication device; and receiving a response frame from the second communication device in response to the transmitted frame, the response frame including information indicating whether the second communication device participates in the multi-AP coordination or not, wherein in a case where a number of other communication device which is a candidate of a participant of the multi-AP coordination is less than two, it is determined to transmit the frame that does not trigger the OFDMA communication to initiate the multi-AP coordination, and in a case where the number of other communication device which is a candidate of a participant of the multi-AP coordination is equal to or more than two, it is determined to transmit the frame that triggers the OFDMA communication.

11. A non-transitory computer-readable storage medium storing a program for causing a computer to execute a communication method for communication between a first communication device configured to operate as an access point in a communication network and a second communication device as an access point different from the first communication device, the communication method comprising:

determining whether to transmit, to initiate a multiple AP (multi-AP) coordination, a frame that triggers Orthogonal Frequency Division Multiple Access (OFDMA) communication or a frame that does not trigger the OFDMA communication;

transmitting, to initiate the multi-AP coordination, the determined frame to the second communication device; and receiving a response frame from the second communication device in response to the transmitted frame, the response frame including information indicating whether the second communication device participates in the multi-AP coordination or not, wherein in a case where a number of other communication device which is a candidate of a participant of the multi-AP coordination is less than two, it is determined to transmit the frame that does not trigger the OFDMA communication to initiate the multi-AP coordination, and in a case where the number of other communication device which is a candidate of a participant of the multi-AP coordination is equal to or more than two, it is determined to transmit the frame that triggers the OFDMA communication.

* * * * *